April 16, 1929.   S. G. VIDLER   1,709,291
SEED TRAP
Filed June 22, 1928   2 Sheets-Sheet 2
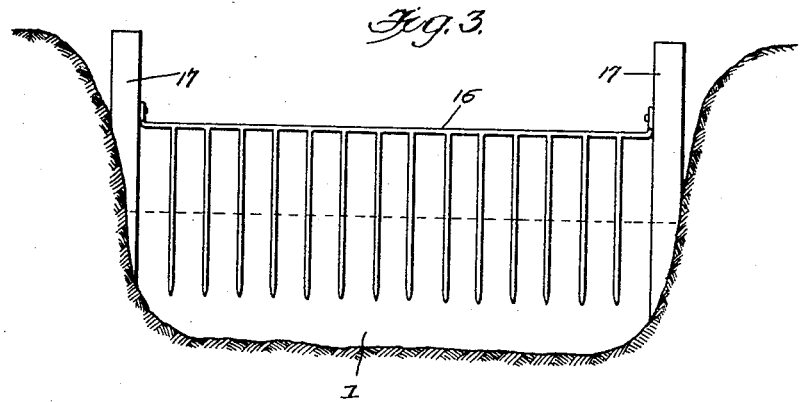
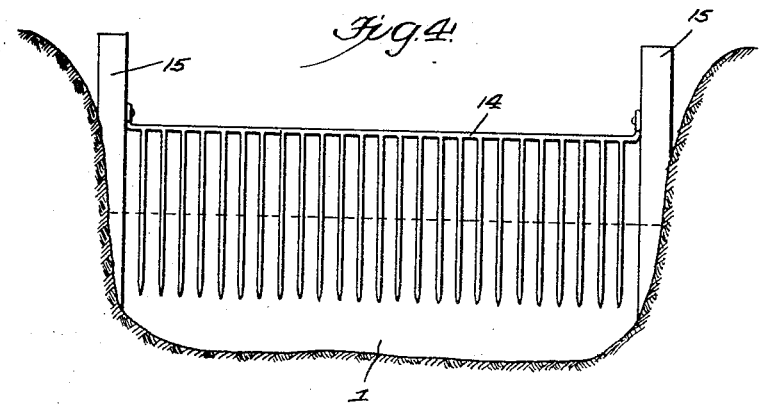
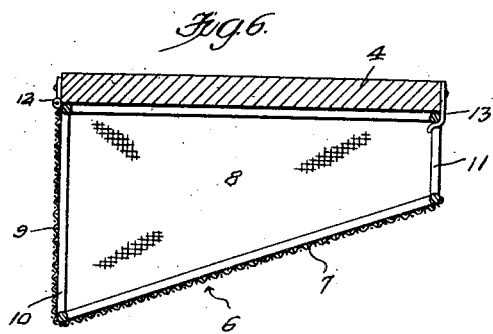
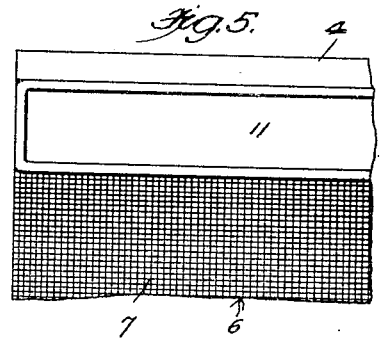
Inventor
S. G. Vidler,
By Clarence A. O'Brien
Attorney Patented Apr. 16, 1929.

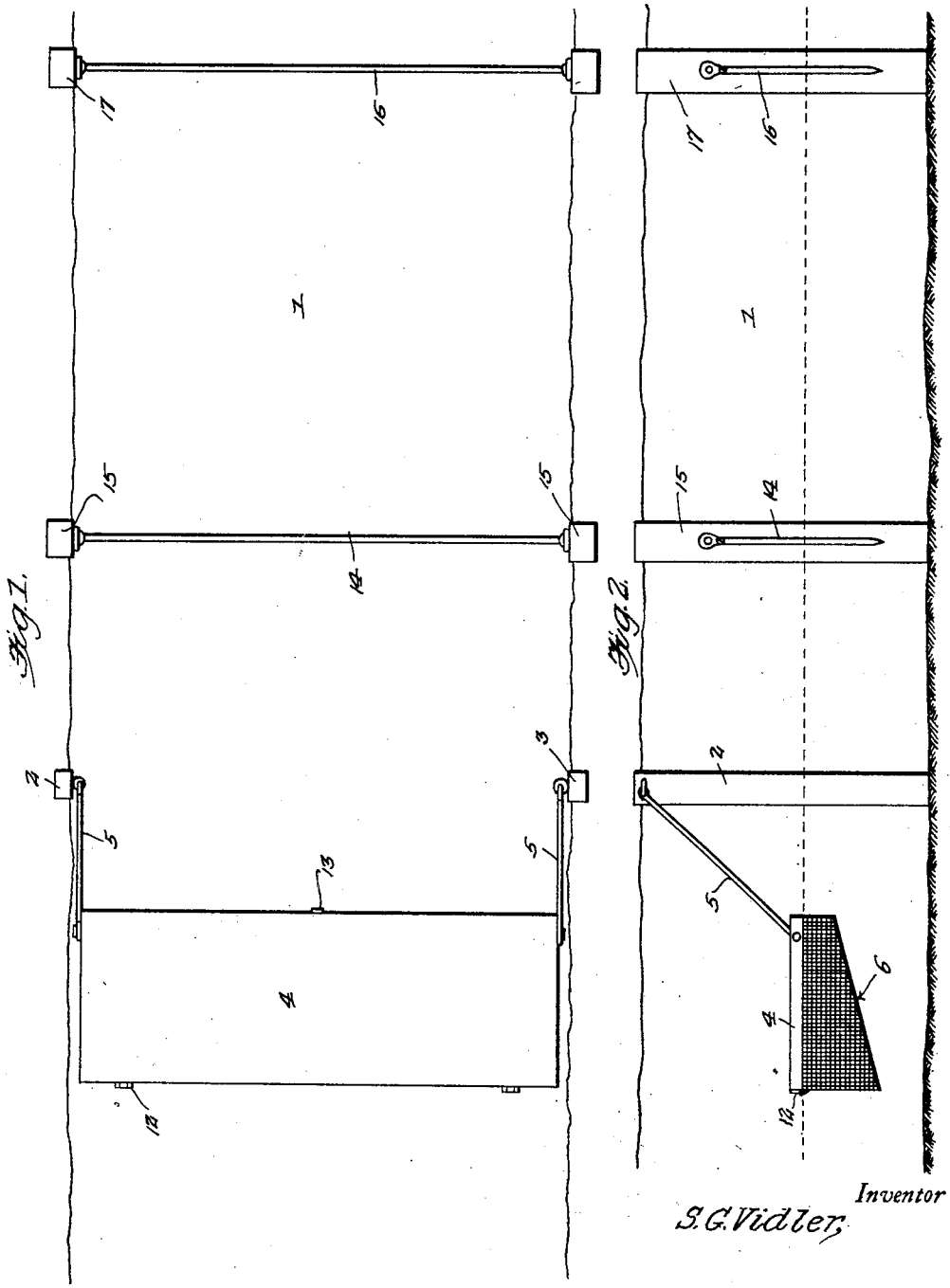

1,709,291

UNITED STATES PATENT OFFICE.

SANDALL GORING VIDLER, OF EL PASO, TEXAS.

SEED TRAP.

Application filed June 22, 1928. Serial No. 237,483.

The present invention relates to a device for straining deleterious seeds that float on top of irrigation canals, ditches, rivers, or any laterals of any kind which carry water for irrigation purposes.

In certain parts of the country, particularly where cotton is grown, deleterious seeds are scattered by the wind and the same are blown into the ditches where in turn they float down during an irrigation period and spread out over the land and cause considerable damage. It is therefore one of the aims of the present invention to eradicate the so called "Johnson grass" grass burs and any character of deleterious seeds by straining the seeds from the top of the water.

One of the important objects of the present invention is to provide a seed trap that will at all times be positive and efficient, as well as automatic in its operation, the same being mounted for swinging movement so as to at all times be positioned at the top of the water to catch the seeds that float on the water.

Still a further object is to provide a seed trap wherein grille bars are arranged forwardly of the seed collecting box for catching all floating weeds and grasses, leaving the water containing the seeds free to float therethrough to the seed straining box.

Still a further object is to provide a seed trap of the above mentioned character which is simple in construction, inexpensive, strong and durable, and further well adapted to the purpose for which it is designed.

Other objects and advantages of the invention will become apparent during the course of the following description when taken in connection with the accompanying drawing.

In the accompanying drawing wherein like reference characters indicate corresponding parts throughout the same:

Figure 1 is a top plan view of a canal or ditch showing my improved seed trap and the grille bars arranged therein.

Figure 2 is a view partly in elevation and partly in section showing the position of the screen box, and the grille bars in the canal.

Figure 3 is a side elevation of the coarser grille bar positioned in the canal in a transverse manner.

Figure 4 is a similar view of the finer grille bar positioned in the canal.

Figure 5 is a fragmentary front elevation of the seed catching box, and

Figure 6 is a longitudinal sectional view therethrough and through the float member to which the screen box is attached.

In the drawings wherein for the purpose of illustration is shown the preferred embodiment of my invention, the numeral 1 designates a canal or ditch, and arranged at opposite sides thereof are the vertical standards 2 and 3, respectively, the same being anchored at their lower ends. A substantially rectangular shaped float forming member 4 is positioned transversely in the canal or ditch, and this float member is pivotally suspended from the upper edge of the spaced standards by means of the links 5 whereby said float is capable of vertical movement of the canal or ditch so as to at all times rest on the upper surface of the water.

A substantially rectangular shaped seed box designated generally by the numeral 6 is attached to the float member 4 and the seed box comprises the screened bottom 7, sides 8 and rear wall 9. A skeleton frame constructed of wire and denoted by the reference character 10 is provided for the screen covering for the sides, bottom and rear wall of the box, and as is clearly shown in Figure 6, the bottom 7 slopes upwardly gradually from the rear wall 9 of the box to the front side thereof, the front side being open to provide an entrance 11. The top of the box is also open, but the float member 4 constitutes a cover therefor. This float member is hingedly secured at its rear edge to the upper rear edge portion of the box 6 as at 12, and suitable spring clips 13 are carried by the forward edge of the float member for detachable engagement over the upper side of the portion of the frame that constitutes the entrance 11 at the front side of the seed box 6 as also shown very clearly in in the drawings. The wire mesh covering for the frame 10 is of such size as to prevent the deleterious seeds from passing therethrough.

The float member 4 will maintain the seed box 6 in the position shown in Figure 2 whereby the entrance 11 of the box will catch all of the seeds that float on the top of the water and manifestly as the water in the canal or ditch rises and falls, the float member 4 will also rise and fall so that the seed box will at all times be maintained in a proper position to catch the seeds. The seeds will collect in the box, but the water will be free to pass through the screened sides and rear walls, and whenever it is necessary to empty the box, this can be easily done by lifting the box out of the canal and detaching the clips 13 so that the float member 4 may be swung upwardly to uncover the open top side of the box in an obvious manner.

Arranged forwardly of the seed box 6 is a vertically disposed grille bar or unit designated generally by the numeral 14, that is secured between the vertical standards 15. An additional vertically disposed coarser grille bar or unit 16 is also arranged transversely across the canal or ditch forwardly of the finer grille bar or unit 14 and is supported between the vertical standards 17. These grille bars provide a means for catching all the floating weeds and grasses and will leave the water containing the seeds free to float therethrough to the seed box.

It will thus be seen from the foregoing description, that I have provided a device that can be readily and easily positioned in a canal, ditch or the like for straining deleterious seeds that float on the surface of the water, and furthermore the device will not interrupt the flow of the water in the canal or ditch.

While I have shown the preferred embodiment of my invention it is to be understood that minor changes in the size, shape and arrangement of parts may be resorted to without departing from the spirit of the invention and the scope of the appended claims.

Having thus described the invention, what I claim is:—

1. In a device for straining seeds that float on the water in a canal, a seed box of foraminous material open at one side, and means for maintaining said seed box at the top of the water to catch the floating seeds.

2. In a device for straining seeds that float on the surface of the water in a canal, a float member extending transversely across the canal, and a foraminous seed collecting box open at one side attached to the bottom of the float.

3. In a device for straining seeds that float on the surface of the water in a canal, a float member extending transversely across the canal, a foraminous seed collecting box open at one side attached to the bottom of the float, and suspension means for the float and the seed box attached thereto.

4. In a device for straining seeds that float on the surface of the water in a canal, a float member extending transversely across the canal, a foraminous seed collecting box open at one side attached to the bottom of the float, suspension means for the float and the seed box attached thereto, said last mentioned means comprising a pair of vertical standards arranged at opposite sides of the canal, and links pivotally connected at their upper ends to the upper ends of the respective standards, the lower ends of the links being pivotally connected to the respective ends of the float member.

5. In a device for straining seeds that float on the water in a canal, a seed box of foraminous material open at one side, means for maintaining said seed box at the top of the water to catch the floating seeds, and grille bars arranged vertically across the canal forwardly of the box to catch floating weeds and prevent the same from reaching the seed box.

6. In a device for straining seeds that float on the surface of the water in a canal, a float member extending transversely across the canal, a foraminous seed collecting box open at one side attached to the bottom of the float, the top of the seed box being open, said float member providing a closure therefor, the float member being hinged to the seed box at one side, and means for detachably connecting the other side of the float member to the adjacent side of the upper portion of the seed box.

In testimony whereof I affix my signature.

SANDALL GORING VIDLER